US006763233B2

(12) United States Patent
Bharatia (10) Patent No.: US 6,763,233 B2
(45) Date of Patent: Jul. 13, 2004

(54) TERMINAL ROAMING OPERATIONS BETWEEN INTERGENERATIONAL WIRELESS NETWORKS

(75) Inventor: Jayshree A. Bharatia, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 433 days.

(21) Appl. No.: 09/748,076

(22) Filed: Dec. 22, 2000

(65) Prior Publication Data

US 2001/0031635 A1 Oct. 18, 2001

Related U.S. Application Data

(60) Provisional application No. 60/174,623, filed on Jan. 5, 2000.

(51) Int. Cl.[7] .................................................. H04Q 7/20
(52) U.S. Cl. ................. 455/433; 455/435.1; 455/432.1; 370/338; 370/352
(58) Field of Search ............................. 455/432.1, 433, 455/436, 426.1, 435.1; 370/338, 349, 328, 352–356, 466

(56) References Cited

U.S. PATENT DOCUMENTS

| | | | |
|---|---|---|---|
| 6,222,829 B1 * | 4/2001 | Karlsson et al. ............. 370/329 |
| 6,230,005 B1 * | 5/2001 | Le et al. ................... 455/414.1 |
| 6,389,008 B1 * | 5/2002 | Lupien et al. ............... 370/352 |
| 6,400,950 B1 * | 6/2002 | Patel et al. ............... 455/435.1 |
| 6,567,667 B1 * | 5/2003 | Gupta et al. ................. 455/445 |
| 6,628,943 B1 * | 9/2003 | Agrawal et al. .......... 455/432.1 |
| 2002/0058507 A1 * | 5/2002 | Valentine et al. ............ 455/433 |
| 2002/0094848 A1 * | 7/2002 | Amin et al. ................. 455/572 |

* cited by examiner

Primary Examiner—William Trost
Assistant Examiner—Sharad Rampuria
(74) Attorney, Agent, or Firm—Bruce E. Garlick (57) ABSTRACT

A method for supporting operation of mobile terminal having a subscription in a packet switched wireless network within a legacy wireless network when the mobile terminal roams into the service area of the legacy network. The mobile terminal sends an attach request to a support node of the legacy wireless network. The legacy wireless network then authenticates the mobile terminal. Next, the support node of the legacy wireless network interacts with the packet switched wireless network to receive the mobile terminal's subscriber data. The home subscriber service function of the packet switched wireless network then interacts with a prior support node to cancel the wireless terminals prior location. The support node of the legacy wireless network next requests a visitor location register of the legacy wireless network to register the mobile terminal. The visitor location register of the legacy wireless network then interacts with the packet switched wireless network to register the mobile terminal within the legacy wireless network. The visitor location register of the legacy wireless network next acknowledges to the support node that the mobile terminal has been registered within the legacy wireless network. Finally, the support node of the legacy wireless network acknowledges the attach request to the mobile terminal. In another operation, a packet switched wireless network services packet switched operations for a packet switched mobile terminal.

11 Claims, 10 Drawing Sheets

TERMINAL ROAMING OPERATIONS BETWEEN INTERGENERATIONAL WIRELESS NETWORKS

CROSS-REFERENCE TO RELATED APPLICATION

The present application claims priority pursuant to 35 U.S.C. Sec 119(e) to U.S. Provisional Application Ser. No. 60/174,623, filed Jan. 5, 2000, which is hereby incorporated by reference in its entirety.

BACKGROUND

1. Technical Field

The present invention relates generally to cellular wireless communication networks; and more particularly to operations of a next generation mobile terminal that is roaming into a legacy wireless communication network.

2. Related Art

Cellular wireless networks include a "network infrastructure" that facilitates wireless communications with mobile terminals operating within a respective service coverage area. The network infrastructure couples to other network to support communications, e.g., the Public Switched Telephone Network (PSTN), the Internet, etc. Wireless mobile terminals operating within a service coverage area of the network infrastructure wirelessly communicate with base stations of the network infrastructure. The network infrastructure routes the communications to another subscribing wireless units, to terminals coupled to the PSTN, to terminals coupled to the Internet, or to terminals coupled via another network to one of these networks.

Various wireless interface standards have been developed to standardize wireless communications between the mobile terminals and the network infrastructure. Wireless interface standards include, for example, the Advanced Mobile Phone Service (AMPS) standards, the Global System for Mobile communications (GSM) standards, the Code Division Multiple Access (CDMA) standards and the Time Division Multiple Access (TDMA) standards. Generations of these standards are generally referred to as first generation (1G), second generation (2G), third generation (3G), fourth generation (4G), etc. Each advancing generation of standards typically performs a greater number of services, supports a greater number of features, and provides better communication qualities. These operating standards may also be partially deployed from generation to generation, e.g., 2G to 2.5G.

Some partial generation wireless standard updates may be deployed using a legacy infrastructure. For example, a 2.5G network has been deployed using upgraded components of a 2G network. However, when moving from one generation to another generation, e.g., 2G to 3G, the network infrastructure must typically be rebuilt using new infrastructure components.

Network infrastructure replacement is both expensive and difficult to deploy. An additional problem resulting from the generational replacement of the network infrastructure relates to backward compatibility for subscribers. With 3G networks, for example, a subscriber subscribes to 3G services, which includes a suite of services. A 3G subscription may include, for example, circuit switched voice services for the subscriber's 2G mobile terminal, packet switched voice service for the subscriber's 3G packet switched mobile terminal, packet data services for the subscriber's personal data assistant, and packet data services for the subscriber's notebook computer, among other services. However, each of the subscriber's wireless devices may not be compatible with the 3G infrastructures. Further, operations of the 3G network must correspond to particular services being employed, i.e., the network must operate differently for different requested services.

In a typical next generation 3G infrastructure, legacy (2G) terminal support will be provided. When 3G systems are deployed, 3G mobile terminals will be placed into service. In such cases, the 3G infrastructures will support the 3G services for the 3G mobile terminals as they operate within the respective service areas. However, the 3G mobile terminals must also be serviced while roaming into legacy 2G wireless networks. Thus backward compatibility issues arise that have not heretofore been addressed.

Further, 3G wireless devices may be placed in service within a legacy network, and thus will be limited in their operation to certain services. If such a 3G wireless device roams from its home service area into an area that supports all 3G packet switched services, the 3G wireless device should not be allowed to receive packet switched services to which it does not subscribe. In such case, the visited network must prevent delivery of these services.

Thus, there is a need in the art for a system and method that may be employed to support both legacy mobile terminals and next generation mobile terminals within next generation wireless communication systems and further to properly service next generation terminals within next generation networks that have subscribed within legacy networks.

SUMMARY OF THE INVENTION

Thus, to overcome the shortcomings of the prior systems and methods, among other shortcomings, a method of the present invention supports operation of mobile terminal having a subscription in a packet switched (3G) wireless network within a legacy (2G) wireless network. Initially, when the 3G mobile terminal roams into the service area of the legacy network, the mobile terminal sends an attach request to a support node of the legacy wireless network. The legacy wireless network then authenticates the mobile terminal.

Next, the support node of the legacy wireless network interacts with the packet switched wireless network to receive the mobile terminal's subscriber data. The home subscriber service function of the packet switched wireless network then interacts with a prior support node to cancel the wireless terminals prior location. The support node of the legacy wireless network next requests a visitor location register of the legacy wireless network to register the mobile terminal. The visitor location register of the legacy wireless network then interacts with the packet switched wireless network to register the mobile terminal within the legacy wireless network.

The visitor location register of the legacy wireless network next acknowledges to the support node that the mobile terminal has been registered within the legacy wireless network. Finally, the support node of the legacy wireless network acknowledges the attach request to the mobile terminal. By interacting with the packet switched wireless network in this manner, the legacy network may not only provide service but determine the level at which service should be performed. These operations are a requirement for proper servicing by the legacy wireless network of the mobile terminal.

In its interaction with the packet switched wireless network to receive the mobile terminal's subscriber data, the support node of the legacy wireless network sends an update location message to a home subscriber service function of the packet switched wireless network. The home subscriber service function of the packet switched wireless network then interacts with the support node of the legacy wireless network to download subscriber data to the support node of the legacy wireless network. With this interaction complete, the home subscriber service function of the packet switched wireless network sends an update location acknowledge message to the support node of the legacy wireless network.

According to one embodiment of these operations, the visitor location register of the legacy wireless network sends a message via the roaming signaling gateway function of the packet switched wireless network to the home subscriber service function of the packet switched wireless network to request an update of the mobile terminal's location. The visitor location register then communicates with the home subscriber service function of the packet switched wireless network via the roaming signaling gateway function of the packet switched wireless network to receive subscriber data for the mobile terminal. With these operations completed, the home subscriber service function of the packet switched wireless network sends a message to the visitor location register of the legacy network via the roaming signaling gateway function of the packet switched wireless network to acknowledge the update of the mobile terminal's location.

According to one embodiment of the mobile terminal, the mobile terminal supports both legacy wireless network operations and packet switched wireless network operations. However, with another embodiment of the mobile terminal, the mobile terminal supports only legacy wireless network operations.

According to an additional operation for the methods described above, a packet data context for the mobile terminal within the legacy wireless network is created. Moreover, after the registration operations have been completed, the mobile terminal may originate a call within the legacy wireless network. Further, the legacy wireless network may terminate a call to the mobile terminal.

In terminating a call to the mobile terminal, the legacy wireless network receives a call termination request from a coupled network at a gateway switch. The gateway switch then sends a routing information request message to the roaming signaling gateway function of the packet switched wireless network. The roaming signaling gateway function of the packet switched wireless network next interacts with the home subscriber service function of the packet switched wireless network to determine a serving switch of the legacy wireless network.

As a further operation, the roaming signaling gateway function of the packet switched wireless network interacts with the serving switch of the legacy wireless network to determine a roaming number for the mobile terminal. The roaming signaling gateway function of the packet switched wireless network forwards the roaming number for the mobile terminal to the originating switch. Finally, the originating switch terminates the call to the mobile terminal via the serving switch.

According to a second operation of the present invention, a packet switched wireless network services packet switched operations for a packet switched mobile terminal. In servicing the communication, a servicing support node of the packet switched wireless network receives an attach request message from the mobile terminal. In response, the packet switched wireless network authenticates the mobile terminal. Next, the support node of the packet switched wireless network interacts with a home subscriber service function of the packet switched wireless network to receive the mobile terminal's subscriber data. The support node of the packet switched wireless network then interacts with a home subscriber service function of the packet switched wireless network to update the mobile terminal's location. The support node of the packet switched wireless network responds to the mobile terminal with an attach accept message.

The mobile terminal then sends an application registration request message via the support node to a call state control function of the packet switched wireless network, wherein the application request message seeks to register a voice over internet protocol application supported by the mobile terminal. The call state control function of the packet switched wireless network next interacts with the home subscriber service function of the packet switched wireless network to register the application. Finally, the call state control function of the packet switched wireless network sends a registration confirmation message to the mobile terminal.

After these operations have been completed, the mobile terminal may originated a packet switched call and the packet switched network will service the call. Further, the packet switched wireless network may receive a packet switched call by the packet switched wireless network and terminate the packet switched call to the mobile terminal via the packet switched wireless network.

In terminating the packet switched call to the mobile terminal via the packet switched wireless network, a home call state control function of the packet switched wireless network receives a call setup message. The home call state control function of the packet switched wireless network then interacts with the home subscriber service function of the packet switched wireless network to determine a serving call state control function of the packet switched wireless network. Next, the home call state control function of the packet switched wireless network forwarding the call setup message to the serving call state control function of the packet switched wireless network. Finally, the serving call state control function of the packet switched wireless network operates to initiate call termination to the mobile terminal.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1A:
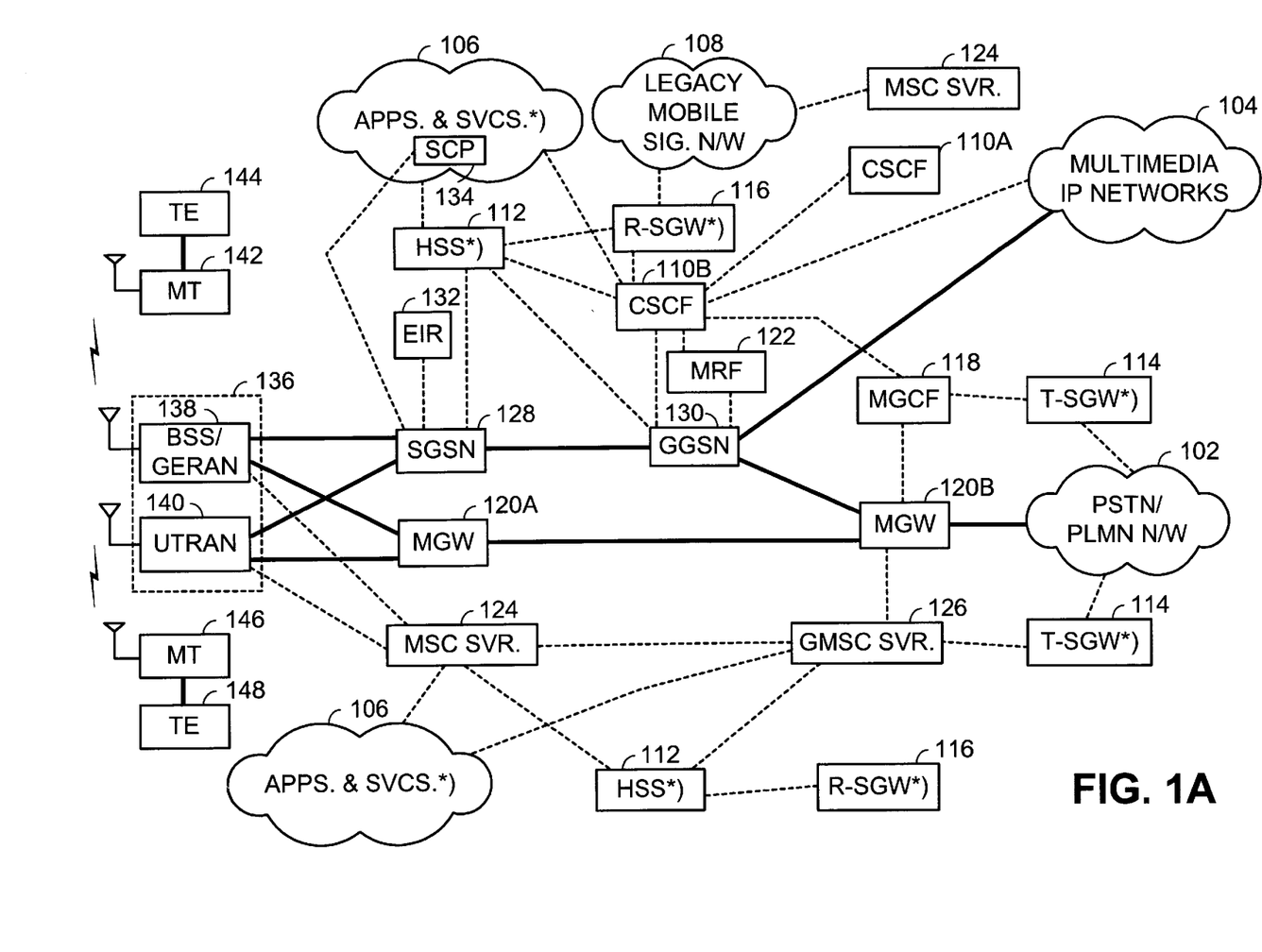
FIG. 1A is a system diagram illustrating a portion of a next generation (3G packet switched) cellular wireless communication system in which the present invention is employed to support legacy (2G) mobile terminal roaming operations.

FIG. 1A is a system diagram illustrating a portion of a next generation (3G packet switched) cellular wireless communication system in which the present invention is employed to support legacy mobile terminal roaming operations. The system of FIG. 1A operates according to next generation (3G) standards that will replace, in some cases, prior 2G standards. Generally speaking, the next generation 3G standards are for a completely Internet Protocol packet switched system. While prior 2G systems support a combination of packet switched and circuit switched operations, the 3G infrastructure is fully packet switched. For a general description of 2G systems, refer to GSM standards documents published by the ETSI of Valbonne, France. In particular, the document ETSI EN 301 344 V7.4.0 (2000-03) prior art operations within a legacy 2G wireless communication system. 3G operations were not fully developed at the time of the present filing.

Figure 1B:
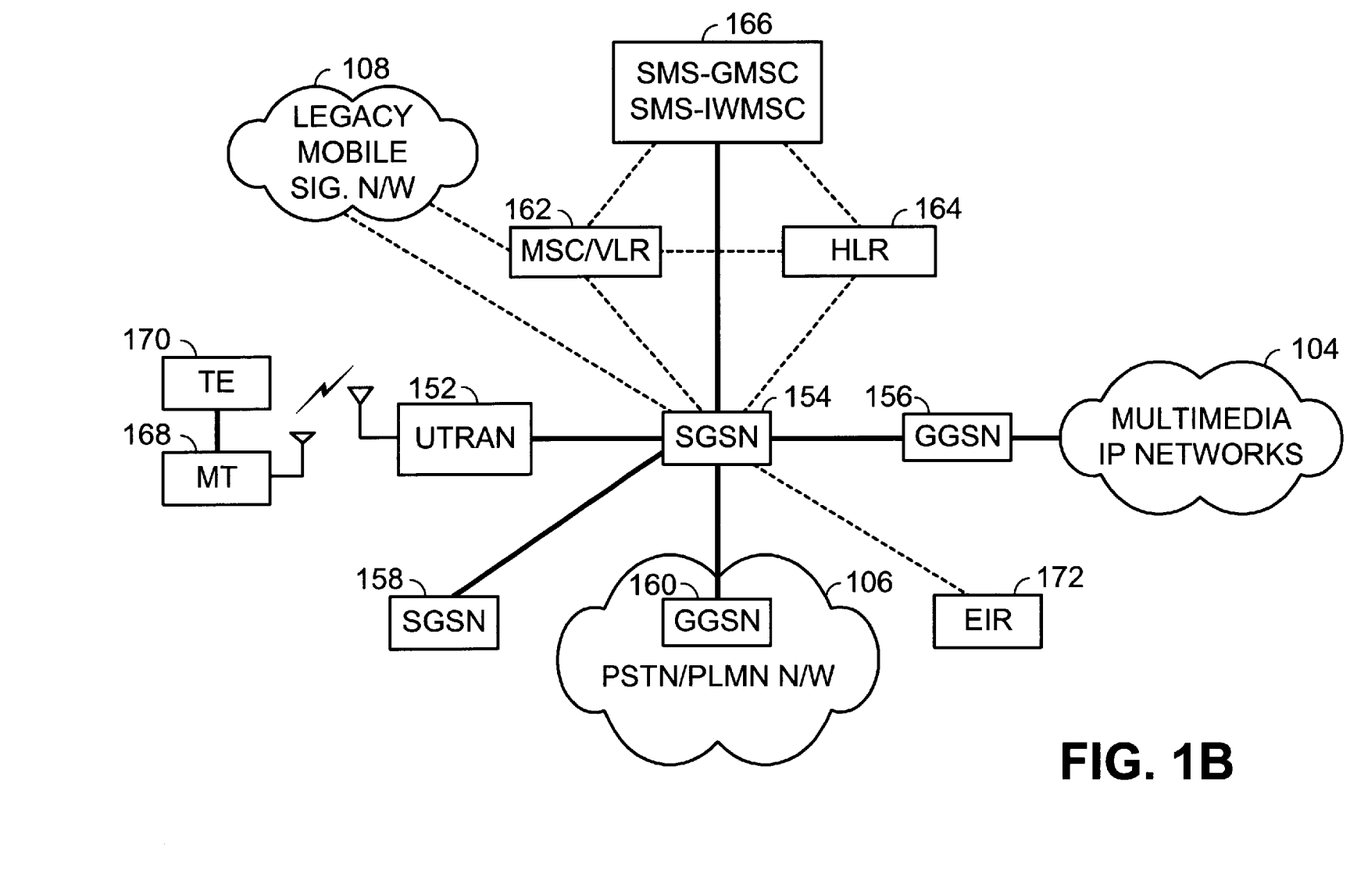
FIG. 1B is a system diagram illustrating a portion of a legacy 2G cellular wireless communication system with which the present invention is employed to support legacy mobile terminal roaming operations within the 3G packet switched cellular wireless communication system of FIG. 1A.

The following acronyms are used with respect to the elements of FIGS. 1A and 1B:

BSS—Base Station System

2G—Referring to a legacy Circuit Switched network infrastructure or a legacy mobile terminal that supports circuit switched operations.

3GPP—Third Generation Partnership Project operations (and related body of standard operating procedures, such operations, and systems that support such operations)

3G—Referring to a next generation Packet Switched network infrastructure or a mobile terminal that supports packet switched services, including packet switched voice communications.

BSS—Base Station System

CCF—Call Control Functions

CSCF—Call State Control Functions

EIR—equipment identity register

GGSN—Gateway GPRS Support Node

GMSC—Gateway Mobile Switching Center

GPRS—GSM Packet Radio System

GSM—Global Standards for Mobility

GSN—GPRS Support Node

GGSN—Gateway GPRS Support Node

GERAN—GSM/EDGE Radio Access Network

HLR—Home Location Register

HSS—Home Subscriber Service

IP—Internet Protocol

ICGW—Incoming Call Gateway

IWMSC—Interworking MSC

MAP—Mobile Application Part

MGCF—Media Gateway Control Function

MGW—Media Gateway Function

MM—Multimedia

MRF—Multimedia Resource Function

MSC—Mobile Switching Center

PSTN—Public switched telephone network

PLMN—Public Land Mobile Network

R-SGW—Roaming Signaling Gateway Function

SCP—Service Control Point

SGSN—Serving GPRS Support Node

SPD—Serving Profile Database

T-SGW—Transport Signaling Gateway Function

UMTS—Universal Mobile Telecommunications System

UTRAN—UMTS Terrestrial Radio Access Network

VLR—Visitor Location Register

The system of FIG. 1A provides wireless communications support for mobile terminals 142 and 146. In providing wireless communications, the system may route control signals and communications from and to a plurality of coupled networks, including a Public Switched Telephone Network (PSTN) and/or GSM public land mobile network (PLMN, in combination PSTN/PLMN) 102, multimedia IP networks 104, application and services networks 106 and a legacy mobile signaling network 108. Some of the components of FIG. 1A, including the application and services network 106 are shown twice. Such is the case to minimize confusion in the intercoupling of elements. When a component is shown twice in FIG. 1A, the name of the elements concludes with "*)", such as the application and services network 106, which includes at least one Service Control Point (SCP) 134. Of the connections shown in FIG. 1A, solid lines represent traffic paths while dotted lines represent signaling paths.

Call State Control Functions (CSCFs) 110A and 110B consist of two components: the Serving CSCF and the Interrogating CSCF. The Interrogating CSCF is used in determining how to route mobile terminated calls. For mobile terminated communications, both Serving CSCF and Interrogating CSCF functionality are typically involved. For mobile originated communications, the Interrogating CSCF functionality is not required. Both the Serving CSCF and Interrogating CSCF functionality may be provided within a single network infrastructure element.

The CSCF 110B provides Incoming Call Gateway (ICGW) functionality, Call Control Functions (CCFs), Serving Profile Database (SPD) functions, and Address Handling functions. In providing the ICGW functions, the CSCF 110B acts as a first entry point to the system and performs routing of incoming calls. In performing the ICGW function, the CSCF 110B performs incoming call triggering operations, e.g., call screening, call forwarding, etc. The CSCF 110B also interacts with other system components to perform query address handling operations. In some of these operations, the CSCF 110B communicates with the HSS 112.

In providing the CCFs, the CSCF 110B provides call setup, termination, and state/event management. The CSCF 110B interacts with the MRF 122 in order to support multiparty and other services. The CSCF 110B also reports call events for billing, auditing, intercepting, and for other call event purposes. In performing CCFs, the CSCF 110B also receives and processes application level registration requests and performs various other functions.

The CSCF 110B maintains and manages the SPD. For a serviced subscriber, the CSCF 110B interacts with the HSS 112 of the home domain of the subscriber and receives profile information an all-IP network user. The CSCF 110B stores some of the profile information in the SPD. Upon an access of the system, the CSCF 110B notifies the subscriber's home domain of the initial access. The CSCF 110B may cache access related information e.g., terminal IP address (es) where the subscriber may be reached, etc.

In providing the address handling functions, the CSCF 110B performs analysis, translation, modification if required, address portability, and mapping of alias addresses. The CSCF 110B may also perform temporary address handling for inter-network routing.

The Home Subscriber Service (HSS) 112 is the master database for a given subscriber. It is the entity containing the subscription related information to support the network entities handling calls/sessions. As an example, the HSS 112 could provide support to the call control servers in order to complete the routing/roaming procedures by solving authentication, authorization, naming/address resolution, location dependencies, etc.

The HSS 112 is responsible for storing and managing the following subscriber related information: (1) Subscriber Identification, Numbering and addressing information; (2) User Security information, e.g., Network access control information for authentication and authorization; (3) User Location information at inter-system level (HSS 112 handles the user registration, and stores inter-system location information, etc.); and (4) The subscriber profile, e.g., services supported, service specific information, etc. Based upon this subscriber information, the HSS 112 is also responsible for supporting the call control and short message entities of the different control systems, e.g., circuit switched domain control, packet switched domain control, IP multimedia control, etc., offered by the system operator.

The HSS 112 may integrate heterogeneous information, and enable enhanced features in the core network to be offered to the application and services domain while, at the same time hiding the heterogeneity of the system. The HSS 112 consists of the following functionalities: (1) user control functions required by the IM CN subsystem; (2) a subset of prior generation Home Location Register (HLR) functionality required for the packet-switched domain; and (3) a circuit-switched portion of the prior generation HLR, if it is desired to enable subscriber access to the circuit-switched domain or to support roaming to legacy GSM/UMTS circuit-switched domains.

In its normal operations, the HSS 112 performs: (1) Management Application Protocol (MAP) termination; (2) Addressing protocol termination; (3) Authentication, Authorization protocol termination; and (4) IP Multimedia (MM) Control Termination. In performing the MAP termination, the HSS 112 terminates the MAP protocol as described in the MAP specification by performing user location management procedures, user authentication management procedures, subscriber profile management procedures, call handling support procedures (routing information handling), and SS related procedures.

In performing the addressing protocol termination, the HSS 122 terminates a protocol to solve addressing according to appropriate standards. In accomplishing this goal, the HSS 122 enacts procedures for subscriber name/numbers/ addresses resolution. In performing authentication and authorization protocol termination, the HSS 112 terminates authentication and authorization protocols according to the appropriate standards. As an example of such operations, the HSS 122 performs subscriber authentication and authorization procedures for IP based multimedia services. Finally, in performing IP MM Control termination, the HSS 112 terminates the IP based MM call control protocol, according to appropriate standards. For example, in accomplishing this operation, the HSS 112 enacts user location management procedures for IP based multimedia services and performs IP based multimedia call handling support procedures.

The Transport Signaling Gateway Function (T-SGW) 114 is the PSTN/PLMN termination point for the network infrastructure. In operation, the T-SGW 114 maps call related signaling from/to the PSTN/PLMN 102 on an IP bearer channel and relays the signaling to/from the MGCF 118. In addition to this function, the T-SGW performs transport level mapping between the PSTN/PLMN 102 and the IP protocol.

The Roaming Signaling Gateway Function (R-SGW) 116 relates only to roaming between circuit switched networks and GPRS domain networks and between 3G UMTS teleservices domains and the UMTS GPRS domain. In order to ensure proper operations during roaming, the R-SGW 116 performs signaling conversion at the transport level between the legacy SS7 based signaling transport and IP based signaling transport. The R-SGW 116 does not interpret the MAP/CAP message but may have to interpret the underlying SCCP layer to ensure proper routing of the signaling. To support 2G mobile terminals, the R-SGW 116 performs interworking functions between the SS7 based signaling transport and the IP base signaling transport of MAP_E and MAP_G.

The Media Gateway Control Function (MGCF) 118 is the PSTN/PLMN termination point for the network infrastructure and its operation is consistent with existing/ongoing industry protocols/interfaces. In performing its functions, the MGCF 118 controls the parts of the call state that pertain to connection control for media channels in a MGW.

The Media Gateway Function (MGW) 120A and 120B is the PSTN/PLMN 102 transport termination point for the network infrastructure. The functions provided by the MGW 120 are consistent with the existing/ongoing industry protocols/interfaces that required for interoperability. The MGW 120 may terminate bearer channels from the PSTN/ PLMN 102. The MGW 120 may also support media conversion, bearer control, and payload processing (e.g., codec, echo canceller, conference bridge, etc.) for support of different circuit switched services. The MGW 120 need not be co-located with the MSC server 124 nor do the resources of the MGW 120 need be associated with any particular MSC server 124. In a system constructed according to the present invention, any MSC server, e.g., 124 may request resources from any MGW, e.g., 120A or 120B.

The Multimedia Resource Function (MRF) 122 performs multiparty call and multimedia conferencing functions, similar to the functions of a Multipoint Control Unit (MCU) in an H.323 network. The MRF 122 is responsible for bearer control (with GGSN 130 and MGW 120A, 120B) in servicing a multiparty/multimedia conference. In such a service, the MRF 122 may communicate with the CSCF 110A or 110B for multiparty/multimedia conference session validation.

The MSC server 124 and the gateway MSC (GMSC) server 126 are highbred elements linking the system of the present invention to legacy 2G GSM networks. The MSC server 124 performs the call control and mobility control parts of a GSM/UMTS MSC. The MSC server 124 is responsible for the control of mobile originated and mobile terminated circuit-switched domain calls. The MSC server 124 terminates the user-network signaling and translates the signaling into the relevant network—network signaling. The MSC server 124 also contains a VLR to hold the subscriber's service data. The MSC server 124 also controls the parts of the call state that pertain to connection control for media channels in the MGW 120A/120B. The GMSC server 126 performs the call control and the mobility control parts of a GSM/UMTS GMSC.

Two GPRS service nodes (GSNS) are illustrated in FIG. 1A—a Serving GSN (SGSN) 128 and a Gateway GSN (GGSN) 130. In order to integrate GPRS into the 3G architecture, GPRS support nodes have been introduced. GSNs are responsible for the delivery and routing of data packets between the mobile terminals 142 and 146 and the multimedia IP networks 104. The SGSN 128 is responsible for the delivery of data packets from and to the mobile terminals 146 and 142 within its service area. Its tasks include packet routing and transfer, mobility management (attach/detach and location management), logical link management, and authentication and charging functions. The location register of the SGSN 128 stores location information (e.g., current cell, current VLR) and user profiles (e.g., IMSI, address(es) used in the packet data network) of all GPRS users registered with this SGSN 128. Further, the SGSN 128 interfaces with the equipment identity register (EIR) 132, which stores information pertinent to the attached mobile terminals.

The GGSN 130 acts as an interface between the GPRS backbone network and the multimedia IP networks 104. The GGSN 130 converts the GPRS packets coming from the SGSN 128 into the appropriate packet data protocol (PDP) format (e.g., IP or X.25) and sends them out on the multimedia IP networks 104. In the other direction, PDP addresses of incoming data packets are converted and readdressed to the GSM address of the destination user by the GGSN 130. The readdressed packets are sent to the responsible SGSN 128. For this purpose, the GGSN 130 stores the current SGSN 128 address of the user and his or her profile in its location register. The GGSN 130 also performs authentication and charging functions.

In general, there is a many-to-many relationship between the SGSNs and the GGSNs. With these relationships, the GGSN 130 is the interface to the multimedia IP networks 104 for several SGSNs. Further, the SGSN 128 may route its packets over different GGSNs to reach different packet data networks. For ease in description, FIG. 1A only includes a single SGSN 128 and a single GGSN 130.

A GSM/EDGE Radio Access Network (GERAN) base station 138 and a UMTS Terrestrial Radio Access (UTRAN) base station 140 together support wireless communications for both a legacy 2G mobile terminal 146 and a 3G mobile terminal 142. The UTRAN base station 140 supports legacy (2G) UMTS wireless communications with the legacy mobile terminal 146 while the GERAN base station 138 supports wireless communications with the 3G mobile terminal 142. The 3G mobile terminal 142 provides wireless communication support to terminal equipment 144, to which it provides wireless communication services. The legacy (2G) mobile terminal 146 couples to terminal equipment 148 for which it provides wireless communication services.

The legacy mobile terminal 146 operates according to 2G standards, but interfaces with the 3G system of FIG. 1A. Operations within the 3G system of FIG. 1A support the legacy mobile terminal 146. In one particular operation according to the present invention, the legacy mobile terminal 146 has a subscription with the 3G system of FIG. 1A but does not fully support the services that may be provided by the 3G system. In such case, special operations must be employed within the system to service the legacy mobile terminal 146. Further, legacy terminals that subscribe within a 2G system roam into the service coverage area and must be serviced. These operations are also supported by the system of FIG. 1A.

FIG. 1B is a system diagram illustrating a portion of a legacy 2G cellular wireless communication system with which the present invention is employed to support legacy mobile terminal roaming operations within the 3G packet switched cellular wireless communication system of FIG. 1A. The system includes a UTRAN (legacy) base station 152 that supports wireless communications with a mobile terminal 168 coupled to terminal equipment 170. A SGSN 154 (2G variety) couples to the BSS 152 and supports the SGSN 154. A GGSN 156 couples to the SGSN 154 and also couples to the multimedia IP networks 104. Another GGSN 160 couples the SGSN 154 to the PSTN/PLMN networks 106. Another SGSN 158 also couples to the SGSN 154. An EIR 172 couples to the SGSN 154.

An SMS-GMSC/SMS-IWMSC 166 couples to the SGSN 154 and provides SMS support to the SGSN 154 (and other components of the network). Further, an MSC/VLR 162 and an HLR 164 couple to the SGSN 164 and also to the legacy mobile signaling network 108. As with FIG. 1A, traffic paths of FIG. 1B are indicated with solid lines while signaling paths of FIG. 1B are indicated with dashed lines. Further, the network of FIG. 1B may include further components that are known but that are not required to describe the teachings of the present invention. The system of FIG. 1B supports 3G mobile terminals that roam into the system's service coverage area according to the present invention. These operations are described with particular reference to FIGS. 6 through 9.

Figure 2:
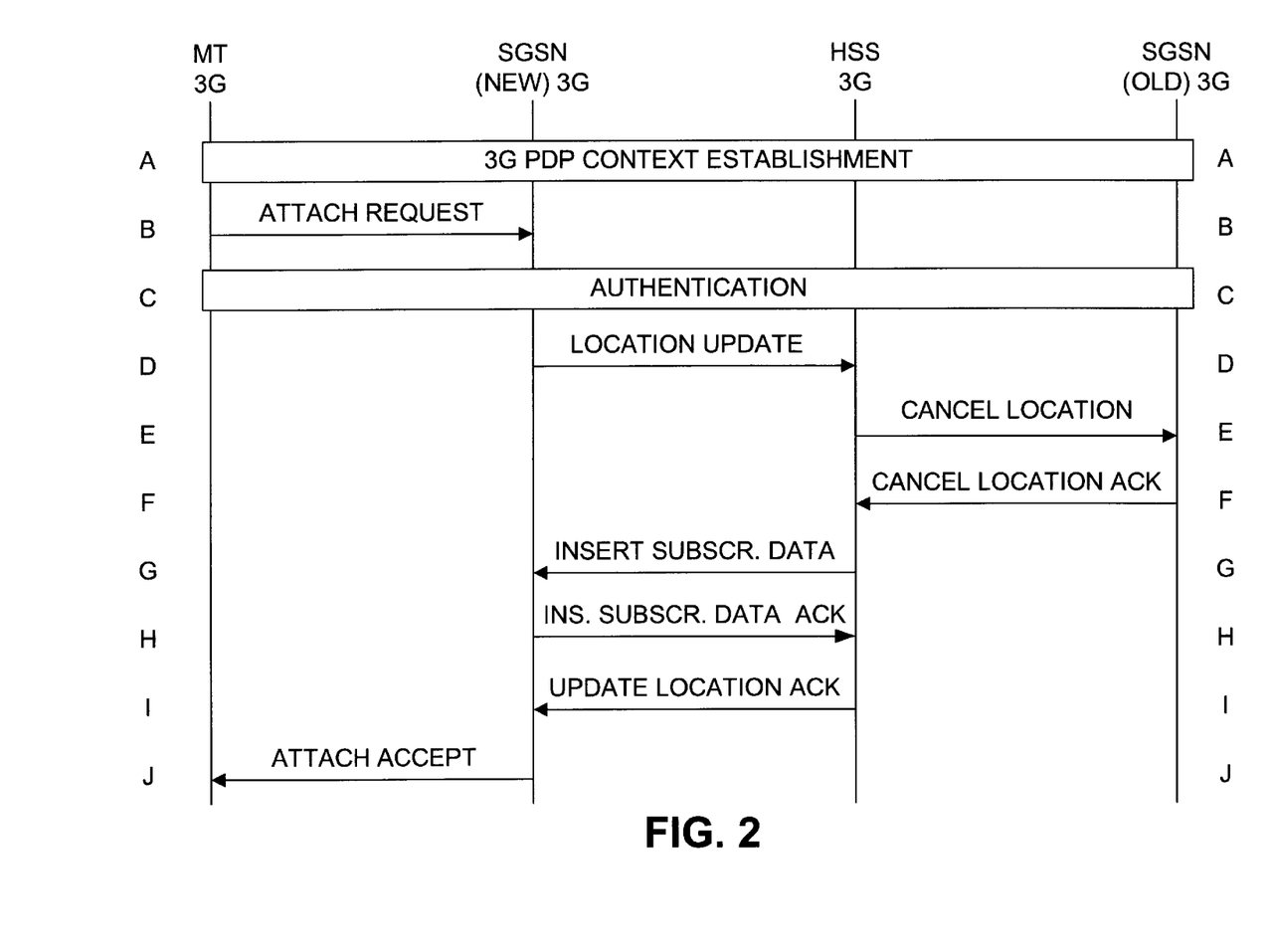
FIG. 2 is a message flow diagram illustrating the attachment of a 3G (packet switched) terminal that has roamed within a 3G (packet switched) network such that it is being serviced by a new SGSN.

FIG. 2 is a message flow diagram illustrating the attachment of a 3G (packet switched) terminal that has roamed within a 3G (packet switched) network such that it is being serviced by a new SGSN. The description of FIG. 2 is organized according to the particular events identified by corresponding letter identifiers.

A. The mobile terminal and the network infrastructure interact to perform a Context Establishment Operation (as defined in the 3GPP specifications at section 23.060).
B. The mobile terminal initiates an attach procedure by the transmission of an Attach Request message to the New SGSN. If the message is received with a packet Temporary Mobile Subscriber Identity (P-TMSI), the New SGSN sends an Identity Request message to the Old SGSN to get the corresponding International Mobile Subscriber Identity (IMSI). If the received IMSI is unknown to the New SGSN, the New SGSN sends an Identity Request message to the mobile terminal. If the Attach Request is received with the IMSI, these procedures are not required.
C. Authentication is performed based upon the security information stored in the HSS.
D. The New SGSN then sends an Update Location message to the HSS.
E. The HSS sends a Cancel Location message to the Old SGSN with a cancellation type set to Update Procedure.

F. The Old SGSN recognizes the request. If no ongoing transactions exist for the mobile terminal, the Old SGSN acknowledges the Cancel Location message with a Cancel Location Acknowledge message.

G. The HSS then sends an Insert Subscriber Data message to the New SGSN that includes subscriber data for the mobile terminal. If a recent cache of the profile for the mobile terminal is available from the local directory in the 3G network (EIR 132), the message may not include subscriber information for the mobile terminal. In such case, it is assumed that the New SGSN will access this information directly from the local cache.

H. The New SGSN then validates the mobile terminal's presence in the new routing area. If all checks are successful, then the New SGSN constructs a MultiMedia (MM) context for the mobile terminal and returns an Insert Subscriber Data Acknowledge message to the HSS.

I. The HSS then acknowledges the Update Location message by sending an Update Location Acknowledge message to the New SGSN.

J. Finally, the New SGSN confirms completion of the attachment and registration to the mobile terminal by sending an Attach Accept message to the mobile terminal.

Figure 3:
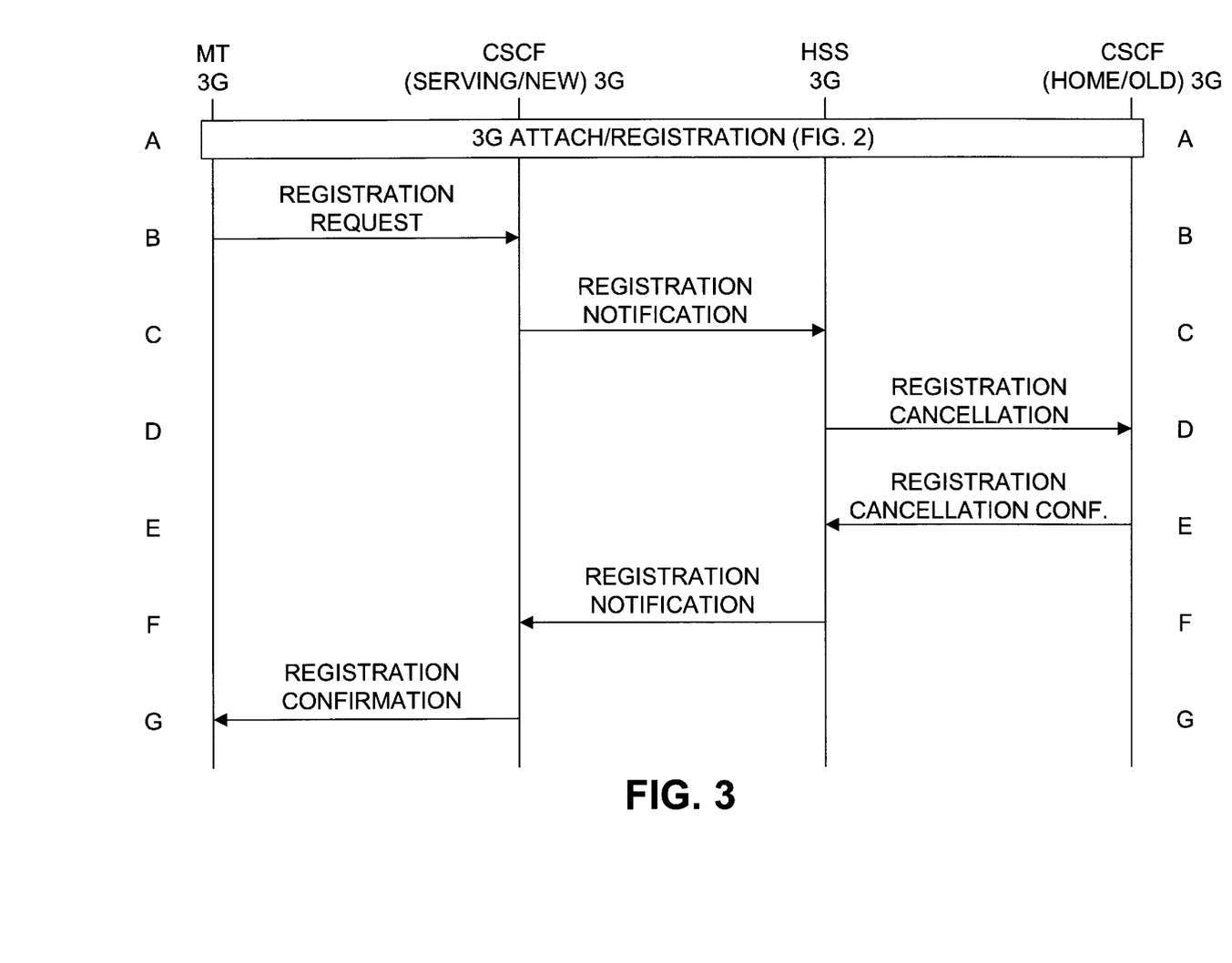
FIG. 3 is a message flow diagram illustrating the attachment of a 3G (packet switched) application serviced by a 3G mobile terminal within a 3G (packet switched) network.

FIG. 3 is a message flow diagram illustrating the attachment of a 3G (packet switched) application serviced by a 3G mobile terminal within a 3G (packet switched) network. The description of FIG. 3 is organized according to the particular events identified by corresponding letter identifiers. The application registration procedure described with reference to FIG. 3 is an optional method to register with the HSS a subscriber application that is serviced by the serving CSCF. Alternative methods for performing such a registration include caching serving CSCF information as part of a CSCF discovery procedure, such as those described with reference to FIGS. 4 and 5. The messages described with reference to FIG. 3 are new messages that may be applied to a packetized voice application, e.g., H.323, SIP, or other VOIP application of the 3G terminal 142 of FIG. 1A.

A. The operations of FIG. 3 are predicated upon the assumption that the mobile terminal has attached/registered with the 3G network according to the operation of FIG. 2 (or similar operation).

B. The mobile terminal initiates registration by sending a Registration Request message to a serving CSCF, the request including the identity of a corresponding subscriber. Note that the mobile terminal previously obtained the identity of the serving CSCF through a "CSCF Discovery" Procedure when attaching to the system.

C. The Serving CSCF requests the subscriber's profile from the HSS by sending a Registration Notification message to the HSS.

D. In response to the receipt of the Registration Notification Message, the HSS sends a Registration Cancellation message to the old CSCF.

E. The old CSCF then erases the current information it stores for the subscriber and acknowledges the request by sending a Registration Cancellation Confirmation message to the HSS.

F. The HSS then provides the subscriber information to the serving SGSN via a Registration Notification Ack message.

G. Finally, the Registration is confirmed to the mobile terminal by the serving CSCF in a Registration Confirmation message.

Figure 4:
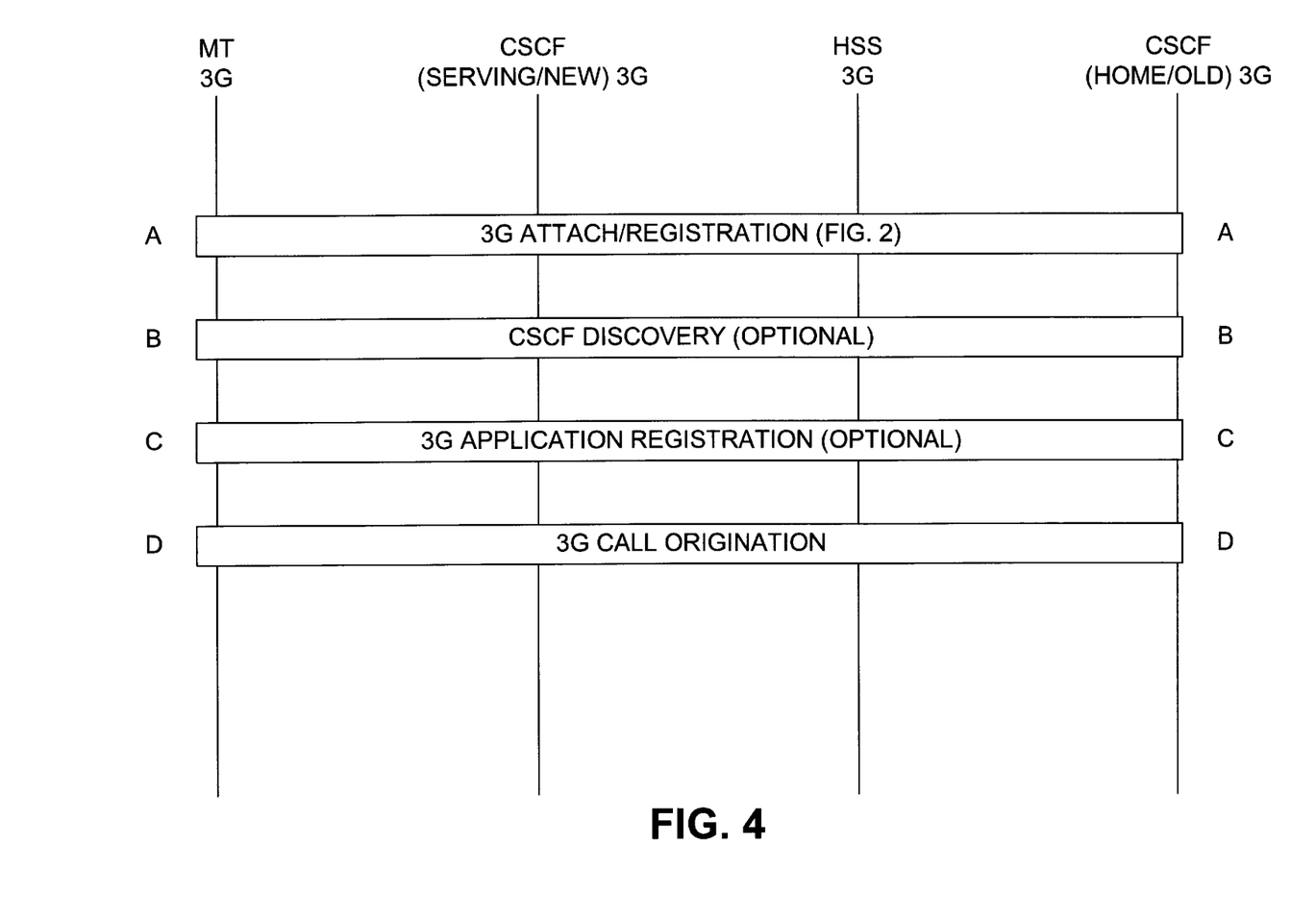
FIG. 4 is a message flow diagram illustrating call origination by a 3G (packet switched) terminal within a 3G (packet switched) network.

FIG. 4 is a message flow diagram illustrating call origination by a 3G (packet switched) terminal within a 3G (packet switched) network. The description of FIG. 4 is organized according to the particular events identified by corresponding letter identifiers.

A. The mobile terminal performs Attach/Registration procedures as were described with reference to FIG. 2 and also performs PDP context Activation using the procedures discussed in the 3GPP specification section 23.060.

B. The mobile terminal then performs CSCF Discovery operations to identify the serving CSCF.

C. The mobile terminal initiates Application Registration as described with reference to FIG. 3.

D. The mobile terminal then initiates, and the network services mobile terminal call origination according to the 3G call origination procedures.

Figure 5:
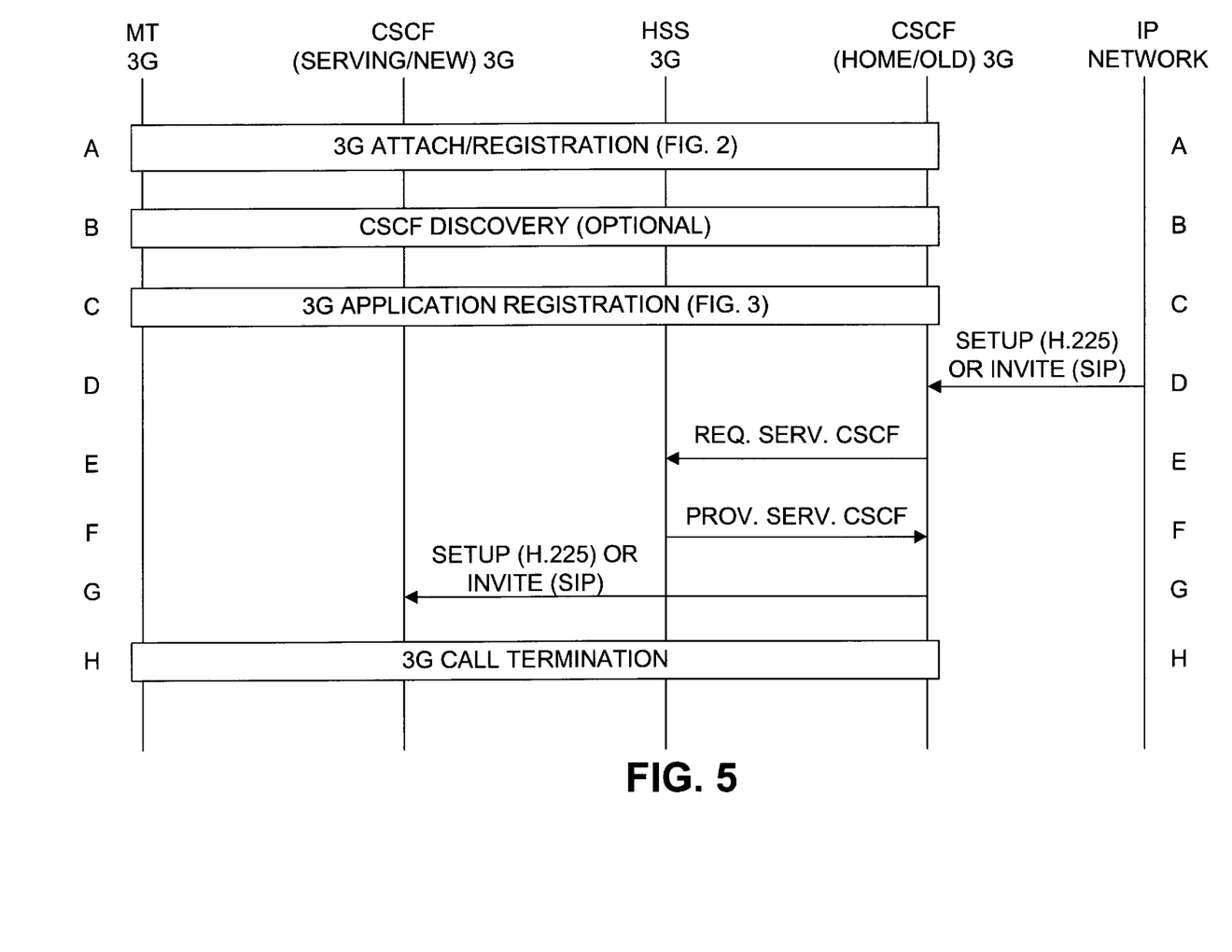
FIG. 5 is a message flow diagram illustrating the termination of a call to a 3G (packet switched) terminal within a 3G (packet switched) network.

FIG. 5 is a message flow diagram illustrating the termination of a call to a 3G (packet switched) terminal within a 3G (packet switched) network. The description of FIG. 5 is organized according to the particular events identified by corresponding letter identifiers.

A. The mobile terminal performs Attach/Registration procedures as were described with reference to FIG. 2. The mobile terminal also activates PDP context using "PDP Context Activation Procedure" discussed in GSM Recommendations 3.60.

B. The mobile terminal then optionally performs CSCF Discovery to identify the serving CSCF.

C. The mobile terminal then optionally performs Application Registration as described with reference to FIG. 3.

D. The home CSCF receives a call termination request in the form of an H.225-Setup, SIP-Invite message, or another VOIP call termination request message.

E. Upon received of the call termination request, the home CSCF validates the subscriber and sends a Request Serving CSCF message to he HSS.

F. Based upon the subscriber's identity, the HSS authorizes the user and checks the subscriber's services capabilities. If successful in this investigation, the HSS sends the serving CSCF address in a Provide Service CSCF Response message to the home CSCF.

G. The home CSCF forwards the H.225-setup or the SIP-Invite message to the serving CSCF.

H. The remaining operations proceed according to the 3G Call Termination procedures.

Figure 6:
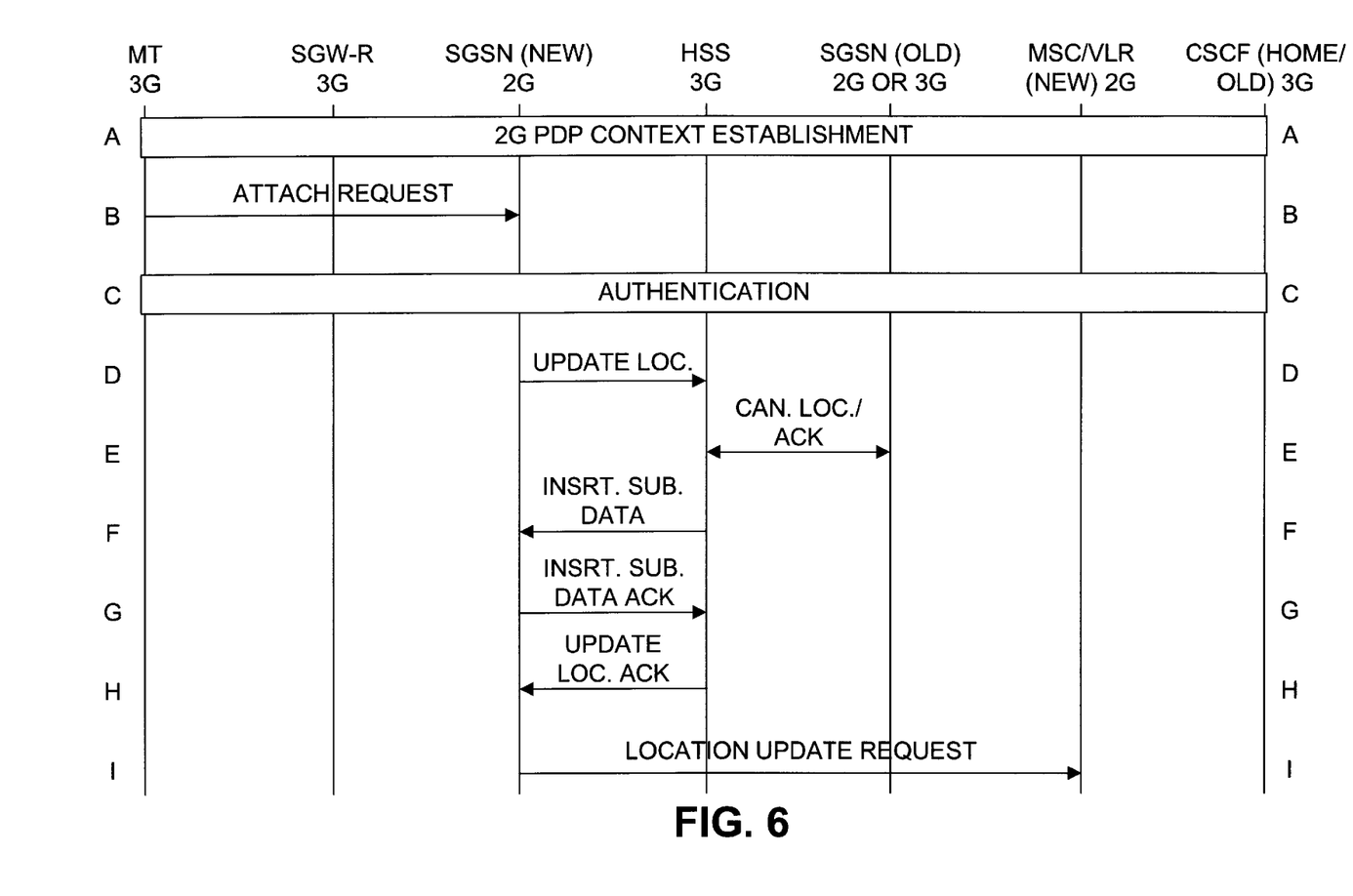
FIGS. 6 and 7 are message flow diagrams illustrating roaming operations of a 3G (packet switched) mobile terminal from a 3G (packet switched) network to a 2G (legacy) network.
Figure 7:
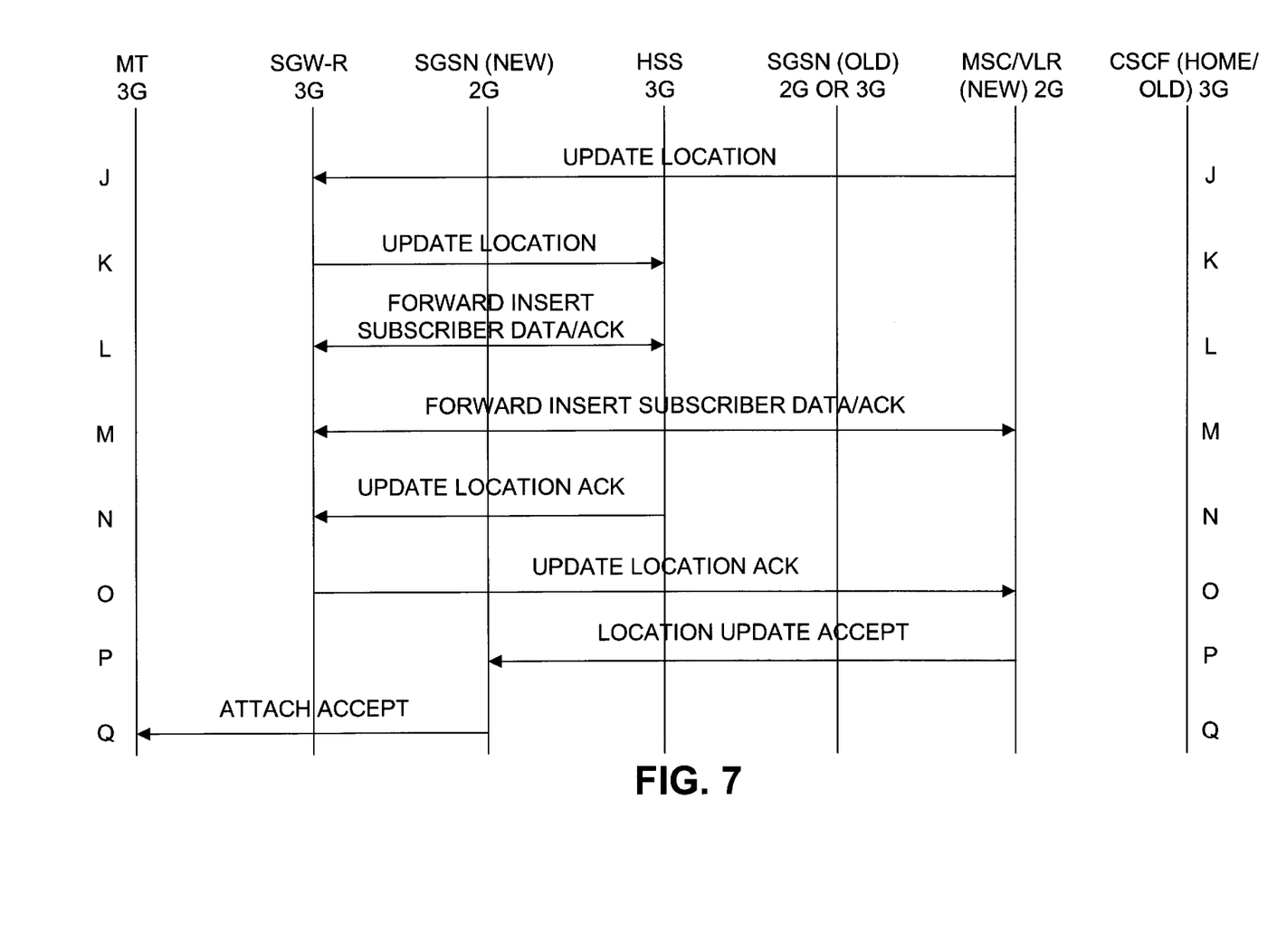

FIGS. 6 and 7 are message flow diagrams illustrating roaming operations of a 3G mobile terminal from a 3G (packet switched) network to a 2G (legacy) network. The description of FIGS. 6 and 7 are organized according to the particular events identified by corresponding letter identifiers.

A. In a first operation, PDP Context Establishment as defined in the GSM 3.60 specification procedure is performed.

B. The mobile terminal initiates an attach procedure by the transmission of an Attach Request message to the New SGSN of the 2G network. If the message is received with a packet Temporary Mobile Subscriber Identity (P-TMSI), the New SGSN sends an Identity Request message to the Old SGSN to get the corresponding international mobile subscriber identity (IMSI). If the received IMSI is unknown to the New SGSN, the New SGSN sends an Identity Request message to the mobile terminal. If the Attach Request is received with the IMSI, these procedures are not required.

C. Authentication is performed based upon the security information stored in the HSS. The authentication operation requires cooperation between the now serving 2G network and the 3G network.

D. The new SGSN then sends an Update Location message to the HSS.

E. The HSS sends an Update Location message to the home/old SGSN with cancellation type set to Update Procedure. The home/old SGSN recognizes the request and, if there are no ongoing transactions, the home/old SGSN acknowledges with a Cancel Location Ack message.

F. The HSS sends an Insert Subscriber Data message to the new SGSN with the subscriber data.

G. The new SGSN validates the mobile terminal's presence in the new routing area. If all checks are successful, the new SGSN constructs a MM context for the mobile terminal and returns an Insert Subscriber Data Ack message to the HSS.

H. The HSS acknowledges the Update Location message by sending an Update Location Act message to the new SGSN.

I. For updating location information, the new SGSN sends a Location Update Request message to the MSC/VLR. Using information in this message, the MSC/VLR creates an association with the new SGSN by storing the new SGSN Number.

J. Referring now the FIG. 7, since the mobile terminal is roaming from a 3G location area to a 2G location area, the new MSC/VLR sends an Update Location message to the Roaming Signaling Gateway (SGW-R). Here, the SGW-R is acting as the HLR for the 2G network with regard to the 3G mobile terminal.

K. The SGW-R then sends a Registration Notification message to the HSS.

L. The HSS then interacts with the SGW-R to send subscriber profile information to the SGW-R in a Forward Insert Subscriber Data message. The SGW-R immediately acknowledges this message by sending a Forward Insert Subscriber Data Ack message.

M. The SGW-R also forwards the subscriber profile information received from the HSS to the new MSC/VLR in an Insert Subscriber Data message. The new MSC/VLR acknowledges this message by sending an Insert Subscriber Data Ack message to the SGW-R.

N. The prior operations have completed the retrieval of the subscriber profile from the 3G HSS. The HSS confirms the completion of this operation by sending a Registration Notification Confirmation message to the SGW-R.

O. Then SGW-R then forwards this confirmation to the MSC/VLR by sending an Update Location Ack message.

P. The new MSC/VLR acknowledges the location update request by sending a Location Update Accept message to the new SGSN.

Q. Finally, the new SGSN confirms the completion of attachment and registration by sending an Attach Accept message to the mobile terminal.

Figure 8:
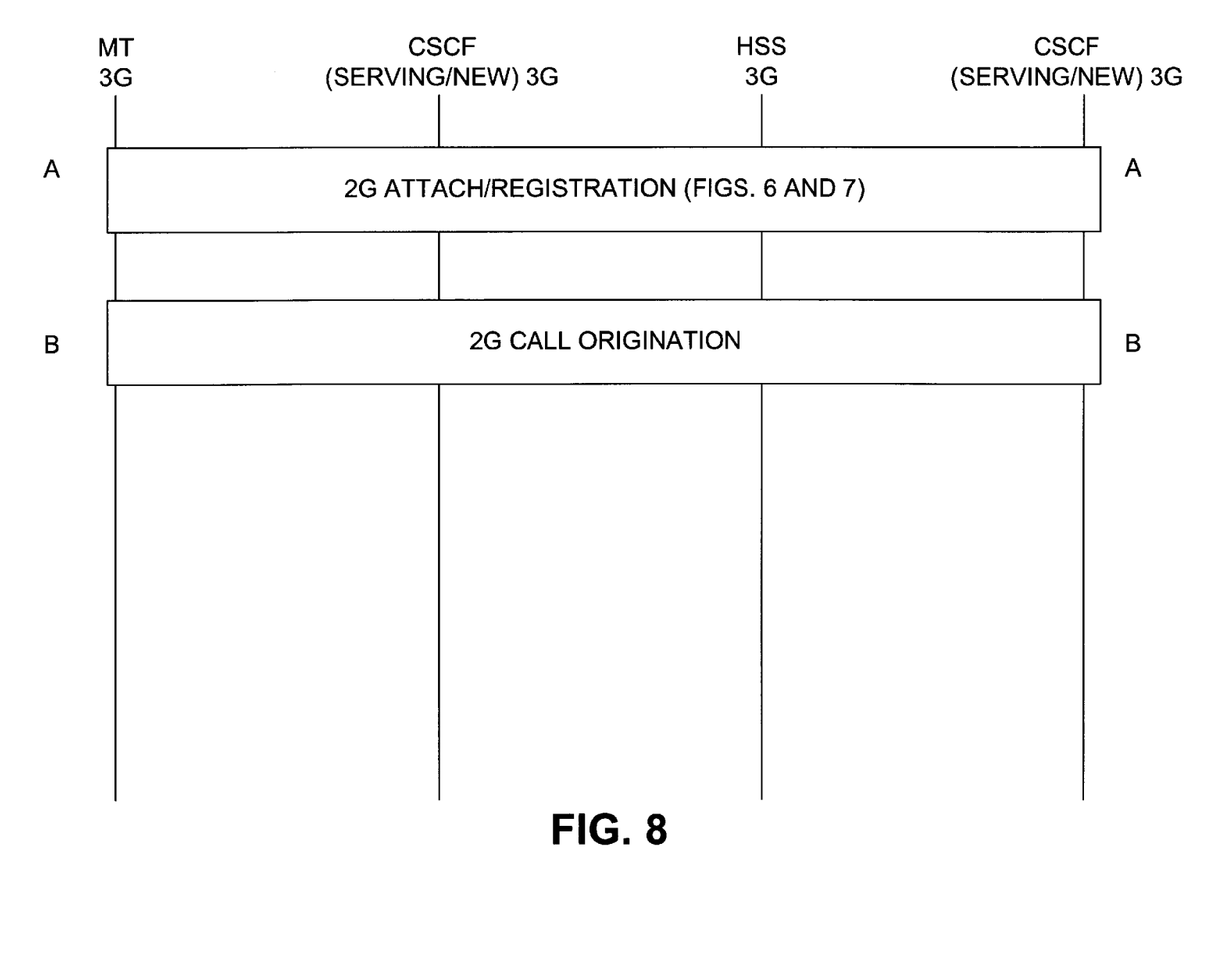
FIG. 8 is a message flow diagram illustrating call origination by a 3G (packet switched) mobile terminal that has roamed from a 3G (packet switched) network to a 2G (legacy) network.

FIG. 8 is a message flow diagram illustrating call origination by a 3G (packet switched) mobile terminal that has roamed from a 3G (packet switched) network to a 2G (legacy) network. The description of FIG. 8 is organized according to the particular events identified by corresponding letter identifiers A. The mobile terminal performs Attach/Registration operations as was previously described with reference to FIGS. 6 and 7.

B. The call is then originated by the mobile terminal according to the 2G Call Origination scenario.

Figure 9:
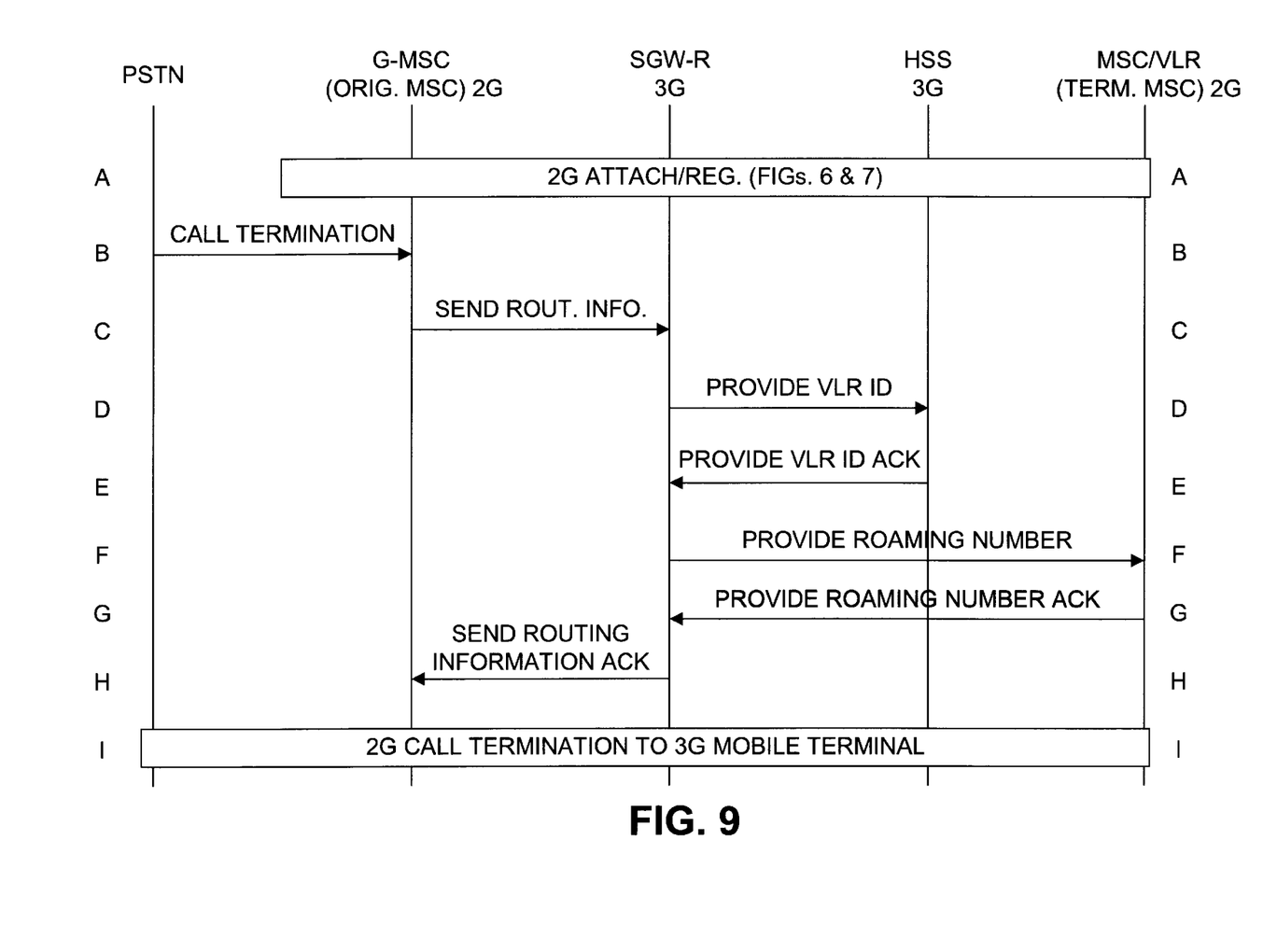
FIG. 9 is a message flow diagram illustrating the termination of a call to a 3G (packet switched) mobile terminal phone having a 3G (packet switched) subscription that has roamed from a 3G (packet switched) network to a 2G (legacy) network.

FIG. 9 is a message flow diagram illustrating the termination of a call to a 3G (packet switched) mobile terminal phone having a 3G (packet switched) subscription that has roamed from a 3G (packet switched) network to a 2G (legacy) network. The description of FIG. 9 is organized according to the particular events identified by corresponding letter identifiers A. The mobile terminal performs Attach/Registration operations as were previously described with reference to FIGS. 6 and 7.

B. A gateway MSC (G-MSC) or (originating MSC in the case of Optimal Routing Support) receives a call termination request from the PSTN/PLMN.

C. The G-MSC (or originating MSC in the case of Optimal Routing Support) transmits a Send Routing Information message to the SGW-R to obtain the Mobile Subscriber Roaming Number (MSRN). In this operation, the SGW-R is acting as the equivalent of an HLR for the mobile terminal within the 2G network.

D. The SGW-R forwards the request to the HSS in a Provide VLR identity message.

E. The HSS acknowledges the request by sending a Provide VLR Identity Ack message to the SGW-R. This message contains the identity of the terminating MSC/VLR. Note that the MSC/VLR number differs from the MSRN.

F. Using the information received in the Provide VLR Identity Ack message, the SGW-R sends a Provide Roaming Number message to the terminating VLR.

G. The terminating MSC/VLR returns the MSRN to the SGW-R in a Provide Roaming number Ack message.

H. The SGW-R then forwards the MSRN to the G-MSC in a Send Routing Information Ack message.

I. Using the MSRN received in the Send Routing Information Ack message, the G-MSC routes the incoming call to the terminating MSC/VLR. The remainder of the call termination is performed according to the 2G Call Termination scenario.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for operating a packet switched wireless network to service communications for a mobile terminal that services both packet switched communications and circuit switched communications, the method comprising:

receiving an attach request message from the mobile terminal by a servicing support node of the packet switched wireless network;

authenticating the mobile terminal;

the servicing support node of the packet switched wireless network interacting with a home subscriber service function of the packet switched wireless network to receive the mobile terminal's subscriber data;

the servicing support node of the packet switched wireless network interacting with a home subscriber service function of the packet switched wireless network to update the mobile terminal's location;

the servicing support node of the packet switched wireless network responding to the mobile terminal with an attach accept message;

wherein the attach accept message indicates that the mobile terminal will be provided with packet switched service when the mobile terminal's subscriber data indicates that the mobile terminal subscribes to packet switched service;

wherein the attach accept message indicates that the mobile terminal will be provided with circuit switched service when the mobile terminal's subscriber data indicates that the mobile terminal is not subscribed to packet switched service; and servicing communications for the mobile terminal consistently with the attach accept message.

2. The method of claim 1, wherein:

the mobile terminal receives packet switched voice service when the mobile terminal's subscriber data indicates that the mobile terminal subscribes to packet switched service; and the mobile terminal does not receive packet switched voice service when the mobile terminal's subscriber data indicates that the mobile terminal is not subscribed to packet switched service.

3. The method of claim 1, further comprising:

receiving a packet switched call by the packet switched wireless network; and terminating the packet switched call to the mobile terminal via the packet switched wireless network.

4. The method of claim 3, wherein terminating the packet switched call to the mobile terminal via the packet switched wireless network comprises:

a home call state control function of the packet switched wireless network receiving a call setup message;

the home call state control function of the packet switched wireless network interacting with the home subscriber service function of the packet switched wireless network to determine a serving call state control function of the packet switched wireless network;

the home call state control function of the packet switched wireless network forwarding the call setup message to the serving call state control function of the packet switched wireless network; and the serving call state control function of the packet switched wireless network operating to initiate call termination to the mobile terminal.

5. A wireless network that services both packet switched communications and circuit switched communications, the wireless network comprising:

a servicing support node that is operable to receive an attach request message from a mobile terminal;

a home subscriber service function communicatively coupled to the servicing support node, wherein the home subscriber service function is operable to authenticate the mobile terminal by inspecting the mobile terminal's subscriber data and to respond accordingly to the servicing support node;

the servicing support node of the packet switched wireless network operable to respond to the mobile terminal with an attach accept message;

wherein the attach accept message indicates that the mobile terminal will be provided with packet switched service when the mobile terminal's subscriber data indicates that the mobile terminal subscribes to packet switched service;

wherein the attach accept message indicates that the mobile terminal will be provided with circuit switched service when the mobile terminal's subscriber data indicates that the mobile terminal is not subscribed to packet switched service; and the servicing support node servicing communications for the mobile terminal consistently with the attach accept message.

6. The wireless network of claim 5, wherein:

the mobile terminal receives packet switched voice service when the mobile terminal's subscriber data indicates that the mobile terminal subscribes to packet switched service; and the mobile terminal does not receive packet switched voice service when the mobile temilnal's subscriber data indicates that the mobile terminal is not subscribed to packet switched services.

7. The wireless network of claim 5, further comprising:

a home call state control function of the packet switched wireless network that is operable to receive a call setup message corresponding to the mobile terminal;

the home call state control function of the packet switched wireless network operable to interact with the home subscriber service function of the packet switched wireless network to determine a serving call state control function of the packet switched wireless network;

the home call state control function of the packet switched wireless network operable to forward the call setup message to the serving call state control function of the packet switched wireless network; and the serving call state control function of the packet switched winless network operable to initiate call termination to the mobile terminal.

8. A method for operating a packet switched wireless network to service a registration request received from a mobile terminal, the method comprising:

receiving a registration request from the mobile terminal by a servicing support node of the packet switched wireless network, the registration request requesting registration of packet switched services with the packet switched wireless network;

the servicing support node of the packet switched wireless network interacting with a home subscriber service function and a call state control function of to wireless network to determine; based upon the mobile terminal's subscriber data, whether packet switched services for the mobile terminal should be registered;

the support node of the packet switched wireless network responding to the mobile terminal with a registration confirmation message;

wherein the registration confirmation message indicates that to registration request has been accepted when the mobile terminal's subscriber data indicates that to mobile terminal subscribes to packet switched service; and wherein the registration confirmation message indicates that the registration request has been denied when the mobile terminal's subscriber data indicates that the mobile terminal is not subscribed to packet switched service.

9. The method of claim 8, wherein:

the mobile terminal receives packet switched voice service when the mobile terminal's subscriber data indicates that the mobile terminal subscribes to packet switched service; and the mobile terminal does not receive packet switched voice service when the mobile terminal's subscriber data indicates that the mobile terminal is not subscribed to packet switched service.

10. The method of claim 8, further comprising:

receiving a packet switched call by the packet switched wireless network; and terminating the packet switched call to the mobile terminal via the packet switched wireless network.

11. The method of claim 10, wherein terminating the packet switched call to the mobile terminal via the packet switched wireless network comprises:

a home call state control function of the packet switched wireless network receiving a call setup message;

the home call state control function of the packet switched wireless network interacting with the home subscriber service function of the packet switched wireless network to determine a serving call state control function of the packet switched wireless network;

the home call state control function of the packet switched wireless network forwarding the call setup message to the serving call state control function of the packet switched wireless network; and the serving call state control function of the packet switched wireless network operating to initiate call termination to the mobile terminal.

\* \* \* \* \*